United States Patent [19]

Hojo

[11] Patent Number: 5,705,549
[45] Date of Patent: Jan. 6, 1998

[54] RUBBER COMPOSITIONS

[75] Inventor: Masahiro Hojo, Kodaira, Japan

[73] Assignee: Bridgestone Corporation, Tokyo, Japan

[21] Appl. No.: 631,985

[22] Filed: Apr. 15, 1996

[30] Foreign Application Priority Data

Apr. 17, 1995 [JP] Japan ................................ 7-090724

[51] Int. Cl.$^6$ ........................................... C08K 5/24
[52] U.S. Cl. ........................ 524/211; 524/99; 524/191; 524/192; 524/193; 524/194; 528/61; 528/64
[58] Field of Search ..................... 524/211, 99, 191, 524/193, 194; 528/61, 64

[56] References Cited

U.S. PATENT DOCUMENTS

| | | | |
|---|---|---|---|
| 4,124,750 | 11/1978 | O'Mahoney, Jr. | 525/376 |
| 4,607,060 | 8/1986 | Kmiec et al. | 521/89 |
| 5,063,268 | 11/1991 | Young | 524/286 |
| 5,534,569 | 7/1996 | Etoh | 524/99 |

FOREIGN PATENT DOCUMENTS

| | | |
|---|---|---|
| 2-2255309 | 10/1990 | Japan. |
| 5098074 | of 1993 | Japan. |
| 909753 | 11/1962 | United Kingdom. |
| 1330393 | 1/1973 | United Kingdom. |

*Primary Examiner*—Vasu Jagannathan
*Assistant Examiner*—Olga Asinovsky
*Attorney, Agent, or Firm*—Sughrue, Mion, Zinn, Macpeak & Seas, PLLC

[57] ABSTRACT

A rubber composition comprises a particular copolymer containing isobutylene unit, a paramethylstyrene unit and a parabromomethylstyrene unit; natural rubber and/or diene synthetic rubber; carbon black; and at least one hydrazide compound, and has a low value of tan δ at 60° C. with maintaining tan δ at 0° C. at a high level.

6 Claims, No Drawings

RUBBER COMPOSITIONS

BACKGROUND OF THE INVENTION

1. Field of the Invention

This invention relates to rubber compositions, and more particularly to a rubber composition suitable for use in a tread or the like of a pneumatic tire.

2. Description of Related Art

In JP-A-2-255309 is reported that a hydrazide compound lowers a heat generation of a diene polymer rubber composition. Furthermore, various diene rubber compositions containing the hydrazide are disclosed in U.S. Pat. No. 4,124,750, U.S. Pat. No. 4,607,060, GB-A-909,753, GB-A-1,330,393 and the like.

On the other hand, it is known that butyl rubber and halogenated butyl rubber are large in loss factor (tan δ=dynamic loss/dynamic modulus) of rubber itself as compared with the diene polymer such as natural rubber, SBR, BR or the like. Therefore, when the diene polymer is blended with butyl rubber or halogenated butyl rubber, the loss factor of the resulting rubber blend becomes large, so that when the rubber blend is used as a tread rubber, dry-gripping property and wet-gripping property can be improved.

However, when the rubber blend containing the butyl rubber is used as a tread rubber of the tire, the gripping performances are improved as mentioned above, but the loss factor at 50°–60° C. as an indication of rolling resistance is raised to increase the rolling resistance and thereby largely degrade fuel consumption of an automobile.

In order to solve this problem, it is considered to use the above hydrazide compound as a low heat-generating agent. However, the hydrazides are used for the diene polymer, so that they are small in the effect of lowering the heat generation on the butyl rubber having less double bond. Therefore, as the diene polymer becomes replaced with the butyl rubber, the effect of the low heat-generating agent is gradually lost, so that when 10 parts by weight for more of butyl rubber is compounded in the rubber blend, it is difficult to reduce the rolling resistance.

SUMMARY OF THE INVENTION

It is, therefore, an object of the invention to provide a rubber composition being large in the loss factor at about 0° C. but small in the loss factor at 50°–60° C.

The feature that the loss factor is lowered by adding the hydrazide compound to the diene polymer is guessed due to the fact that the hydrazide reacts with a double bond portion of the diene polymer in the course of dispersion of carbon black during the kneading and also reacts with a functional group of carbon black surface and hence the polymer is bonded to the carbon black through the hydrazide to improve the dispersibility of carbon black.

On the contrary, since the double bond portion of the butyl rubber is less, the reaction with the hydrazide hardly occurs and hence the effect of lowering the heat generation is small.

The inventors have made various studies when isobutylene/paramethylstyrene/parabromomethylstyrene copolymer containing a high reactivity parabromomethylstyrene is combined with the diene polymer and the hydrazide compound instead of the butyl rubber and found that the loss factor at about 0° C. of the resulting rubber composition is equal to that of the butyl rubber but the loss factor at about 60° C. is largely reduced as compared with that of the butyl rubber, and as a result the invention has been accomplished.

According to the invention, there is the provision of a rubber composition comprising (1) 10–50 parts by weight of a copolymer containing isobutylene unit, a paramethylstyrene unit and a parabromomethylstyrene unit; (2) (100–Q) parts by weight of natural rubber and/or diene synthetic rubber when the amount of the copolymer of the above item (1) is Q; (3) 20–150 parts by weight of carbon black; and (4) 0.1–5.0 parts by weight of at least one hydrazide compound represented by the following general formulae (I), (II) and (III):

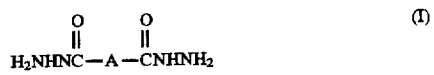

wherein A is a bivalent group obtained from an aromatic ring, a substituted or nonsubstituted hydantoin ring, or a saturated or unsaturated straight-chain hydrocarbon having a carbon number of 1–18, B is a bivalent aromatic hydrocarbon group, X is a hydroxyl group or an amino group, and Y is a pyridyl group or a hydrazino group.

In a preferable embodiment of the invention, a total content of paramethylstyrene unit and parabromomethylstyrene unit in the copolymer is 0.5–20% by weight, and a content of parabromomethylstyrene unit as an atomic content of bromine is 0.1–7.5% by weight.

In another preferable embodiment of the invention, the hydrazide compound is at least one compound selected from the group consisting of phthalic acid dihydrazide, terephthalic acid dihyrdazide, isophthalic acid dihydrazide, succinic acid dihydrazide, adipic acid dihydrazide, azelaic acid dihydrazide, sebacic acid dihydrazide, eicosane diacid dihydrazide, 7,11-octadecadiene-1,18-dicarbohydrazide, oxalic acid dihydrazide, anthraniloylhydrazide, salicylic acid hydrazide, 4-hydroxybenzoic acid hydrazide, 2-hydroxy-3-naphthoic acid hydrazide, isonicotinic acid hydrazide and carbodihydrazide.

DESCRIPTION OF THE PREFERRED EMBODIMENTS

The term "isobutylene unit" constituting the copolymer according to the invention means a unit obtained by the polymerization of isobutylene monomer, and the term "paramethylstyrene unit" means a unit obtained by the polymerization of paramethylstyrene monomer. The copolymer according to the invention is usually obtained by copolymerizing isobutylene monomer with paramethylstyrene monomer and then partially brominizing a methyl portion of the paramethylstyrne unit in the presence of a Lewis acid.

As the diene rubber to be blended with the copolymer, mention may be made of natural rubber, cis-1,4-polyisoprene, styrene-butadiene copolymer, low cis-1,4-polybutadiene, high cis-1,4-polybutadiene, ethylene-propylene-diene terpolymer, chloroprene, halogenated butyl rubber, acrylonitrile-butadiene rubber and the like. At least one diene rubber may be blended with the copolymer.

In the hydrazide compound of the general formula (I), A is an aromatic ring of

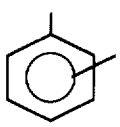

bonded in ortho, meta or para position), a substituted hydantoin ring of

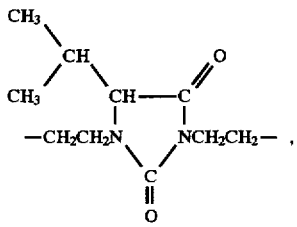

or a saturated or unsaturated straight-chain hydrocarbon group having a carbon number of 1–18 such as ethylene group, tetramethylene group, heptamethylene group, octamethylene group, octadecamethylene group, 7,11-octadecadienylen group or the like.

The compound of the general formula (I) includes phthalic acid dihydrazide, isophthalic acid dihydrazide, terephthalic acid dihydrazide, 1,3-bis(hydrazinocarboethyl)-5-isopropyl hydantoin of

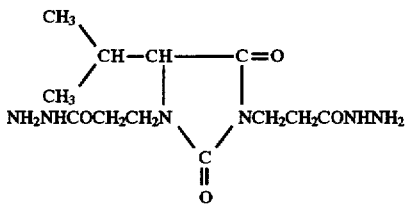

succinic acid dihydrazide, adipic acid dihydrazide, azelaic acid dihydrazide, sebacic acid dihydrazide, eicosane diacid dihydrazide, 7,11-octadecadiene-1,18-dicarbohydrazide and the like.

In the hydrazide compound of the general formula (II), B is preferably a phenyl group or a naphthyl group, and X is preferably a hydroxyl group or an amino group.

The compound of the general formula (II) includes anthraniloylhydrazide of

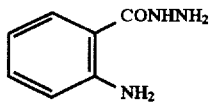

, salicylic acid hydrazide of

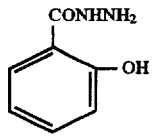

, 4-hydroxybenzoic acid hydrazide of

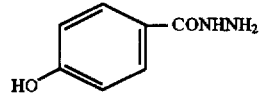

, 2-hydroxy-3-naphthoic acid hydrazide of

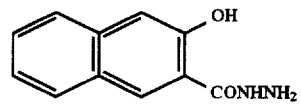

, and the like.

In the hydrazide compound of the general formula (III), Y is preferably a pyridyl group or a hydrazino group.

The compound of the general formula (III) includes isonicotinic acid hydrazide of

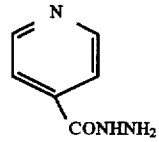

, carbohydrazide of

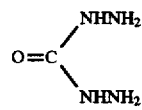

and the like.

Among these hydrazide compounds, 2-hydroxy-3-naphthoic acid hydrazide, isophthalic acid dihydrazide and isonicotinic acid hydrazide are most preferable.

When the amount of the copolymer compounded is less than 10 parts by weight, the amount of the diene polymer rubber becomes too large and hence the effect of lowering the heat generation through the hydrazide compound in the copolymer is substantially equal to that of the butyl rubber and the effect inherent to the invention is hardly obtained. While, when it exceeds 50 parts by weight, the other properties required as the rubber composition are considerably degraded.

When the amount of the hydrazide compound is less than 0.1 part by weight, the low heat-generating effect is not sufficiently obtained, while when it exceeds 5.0 parts by weight, the workability such as resistance to scorching is degraded.

Moreover, it is considered that the hydrazide compound reduces tan δ through nucleophilic substitution reaction with parabromomethylstyrene portion of the copolymer for improving the dispersibility of carbon black likewise the diene polymer rubber. Such an effect of reducing tan δ is influenced by the copolymer and the diene polymer but is generally small at about 0° C. and large at about 50°–60° C.

When the total content of paramethylstyrene unit and parabromomethylstyrene unit in the copolymer is less than 0.5% by weight, the effect of lowering the heat generation through the hydrazide compound is not obtained, while when it exceeds 20% by weight, the glass transition temperature is too high and the physical properties as the rubber composition lower. Similarly, when the atomic content of bromine included in the parabromomethyl styrene unit is less than 0.1% by weight, the effect of lowering the heat generation is not obtained, while when it exceeds 7.5% by weight, the physical properties lower.

When the amount of carbon black is less than 20 parts by weight, the effect of dispersing carbon black through the hydrazide compound is small and the effect according to the invention is not sufficiently obtained and also the fatigue properties and wear resistance of the vulcanizate are poor. While, when it exceeds 150 parts by weight, the other properties such as workability and the like are undesirably degraded and also the low hysteresis loss (low rolling resistance) is not obtained. The amount of carbon black is preferably 25–80 parts by weight. As the carbon black, use may be made of carbon black HAF, carbon black ISAF, carbon black SAF and the like.

Sulfur or the like is used as a vulcanizing agent in an amount of 0.1–5 parts by weight, preferably 1–2 parts by weight based on 100 parts by weight of the rubber ingredient. When the amount is less than 0.1 part by weight, the fatigue properties and wear resistance of the vulcanizate are degraded, while when it exceeds 5 parts by weight, rubber elasticity is lost.

As a process oil usable in the invention, mention may be made of paraffinic oil, naphthenic oil, aromatic oil and the like. Particularly, the aromatic oil is used in case of applications requiring the fatigue properties and wear resistance, while the paraffinic oil or naphthenic oil is used in case of applications requiring the low-temperature properties. The amount of the process oil used is 0–100 parts by weight based on 100 parts by weight of the rubber ingredient. When it exceeds 100 parts by weight, the fatigue properties and low hysteresis loss of the vulcanizate are considerably degraded.

The vulcanization accelerator usable in the invention is not particularly restricted and preferably includes thiazole series vulcanization accelerators such as MBT (2-mercaptobenzothiazole), DM (dibenzothiazyl sulfide), CBS (N-cyclohexyl-2-benzothiazyl sulfenamide) and the like; and guanidine series vulcanization accelerators such as DPG (diphenyl guanidine) and the like. The amount of the vulcanization accelerator used is 0.1–5 parts by weight, preferably 0.2–3 parts by weight based on 100 parts by weight of the rubber ingredient.

The rubber composition according to the invention may be compounded with various additives usually used in the field of rubber industry such as silica, calcium carbonate, titanium oxide, zinc white, stearic acid, antioxidant, antiozonant, silane coupling agent and so on.

The rubber composition according to the invention is obtained by kneading in a kneader such as a Banbury mixer or the like, which is shaped and vulcanized for use in not only tire applications such as tire tread, under tread, carcass, sidewall, bead portion and the like but also industrial goods such as rubber vibration insulator, belt, hose and so on. Particularly, the rubber composition according to the invention is most preferably used as a rubber in the tire tread.

The following examples are given in illustration of the invention and are not intended as limitations thereof.

A rubber composition is prepared by kneading in a laboratory plastomill of 250 ml through 3 inch rolls according to a compounding recipe as shown in Tables 1, 2 and 3, which is then vulcanized at 145° C. for 35 minutes. The properties of the resulting vulcanizate are evaluated to obtain results as shown in Tables 2 and 3.

A vale of tan δ at 60° C. is evaluated as an indication of low hysteresis loss relating to a low rolling resistance of the tire. The tan δ (60° C.) is measured by means of a dynamic spectrometer (made by Rheometric Inc.) under conditions that a temperature is 60° C., a dynamic strain under tension is 1% and a frequency is 10 Hz and represented by an index on the basis that a reciprocal of a value in Comparative Example 1 is 100. The larger the index value, the smaller the hysteresis loss and hence the lower the rolling resistance when the rubber composition is used in the tire tread.

For the comparison with a case containing no low heat-generating agent, the effect of lowering heat generation through the hydrazide compound is represented by an index on the basis that a reciprocal of tan δ at 60° C. in the rubber composition containing no hydrazide derivative (corresponding Comparative Example No. is shown in Tables 2 and 3) is 100.

As an indication of wet-gripping property, tan δ at 0° C. is measured by means of a dynamic spectrometer (made by Rheometric Inc.) under conditions that a temperature is 0° C., a dynamic strain under tension is 1% and a frequency is 10 Hz and evaluated by an index on the basis that the value of Comparative Example 1 is 100. The larger the index value, the better the wet-gripping property.

TABLE 1

| Starting rubber material*1 | 100 parts by weight (details of rubber blend are described in Tables 2 and 3) |
|---|---|
| Hydrazide compound | variable (described in Tables 2 and 3) |
| Carbon black HAF | 50 parts by weight |
| Stearic acid | 2 parts by weight |
| Zinc white | 3 parts by weight |
| Vulcanization accelerator DPG*2 | 0.5 part by weight |
| Vulcanization accelerator DM*3 | 1.5 parts by weight |
| Sulfur | 1.5 parts by weight |

*1In the starting rubber material, the copolymer according to the invention has 2.0% by weight of bromine atomic content and 10.0% by weight in total of paramethylstyrene unit and parabromomethyl-styrene unit unless otherwise specified in Tables 2 and 3.
*2diphenyl guanidine
*3dibenzothiazyl disulfide TABLE 2(a)

|  | Comparative Example No. | | | | | | | | | | | (parts by weight) |
|---|---|---|---|---|---|---|---|---|---|---|---|---|
|  | 1 | 2 | 3 | 4 | 5 | 6 | 7 | 8 | 9 | 10 | 11 | 12 |
| Natural rubber | 100 | 90 | 70 | 60 | 50 | 100 | 90 | 70 | 60 | 50 | 70 | 70 |
| IIR (JSR Butyl 268) |  | 10 | 30 | 40 | 50 |  | 10 | 30 | 40 | 50 |  |  |
| Br-IIR (JSR Bromobutyl 2255) |  |  |  |  |  |  |  |  |  |  | 30 | 30 |
| Copolymer |  |  |  |  |  |  |  |  |  |  |  |  |

TABLE 2(a)-continued

|  | Comparative Example No. (parts by weight) | | | | | | | | | | | |
|---|---|---|---|---|---|---|---|---|---|---|---|---|
|  | 1 | 2 | 3 | 4 | 5 | 6 | 7 | 8 | 9 | 10 | 11 | 12 |
| JSR SBR #1500 |  |  |  |  |  |  |  |  |  |  |  |  |
| Isophthalic acid dihydrazide |  |  |  |  |  | 0.3 | 0.3 | 0.3 | 0.3 | 0.3 |  | 0.3 |
| Isonicotinic acid dihydrazide |  |  |  |  |  |  |  |  |  |  |  |  |
| 2-hydroxy-3-naphthoic acid hydrazide |  |  |  |  |  |  |  |  |  |  |  |  |
| Low hysteresis loss (index on the basis that reciprocal of tan $\delta$ at 60° C. in Comparative Example No. 1 is 100) | 100 | 74 | 67 | 59 | 53 | 130 | 93 | 76 | 65 | 57 | 70 | 84 |
| Effect of lowering heat generation through hydrazide compound (index on the basis that reciprocal of tan $\delta$ at 60° C. in each control (shown in lower row) is 100) |  |  |  |  |  | 130 | 125 | 114 | 110 | 107 |  | 120 |
| Comparative Example No. as a control |  |  |  |  |  | 1 | 2 | 3 | 4 | 5 |  | 11 |
| Wet-gripping property (index on the basis that tan $\delta$ at 0° C. in Comparative Example No. 1 is 100) | 100 | 125 | 198 | 250 | 310 | 98 | 124 | 200 | 245 | 307 | 203 | 203 |

TABLE 2(b)

|  | Comparative Example No. (parts by weight) | | | | | | | | | | |
|---|---|---|---|---|---|---|---|---|---|---|---|
|  | 13 | 14 | 15 | 16 | 17 | 18 | 19 | 20*1 | 21*1 | 22*1 | 23 |
| Natural rubber | 90 | 70 | 60 | 50 | 40 | 70 | 70 | 70 | 70 | 70 | 70 |
| IIR (JSR Butyl 268) |  |  |  |  |  | 30 | 30 | 30 | 30 |  |  |
| Br-IIR (JSR Bromobutyl 2255) |  |  |  |  |  |  |  |  |  |  |  |
| Copolymer | 10 | 30 | 40 | 50 | 30 |  |  |  |  | 30 | 30*2 |
| JSR SBR #1500 |  |  |  |  | 30 |  |  |  |  |  |  |
| Isophthalic acid dihydrazide |  |  |  |  |  |  |  |  | 0.3 |  |  |
| Isonicotinic acid dihydrazide |  |  |  |  |  | 1.0 |  |  |  |  |  |
| 2-hydroxy-3-naphthoic acid hydrazide |  |  |  |  |  |  | 1.0 |  |  |  |  |
| Low hysteresis loss (index on the basis that reciprocal of tan $\delta$ at 60° C. in Comparative Example No. 1 is 100) | 89 | 80 | 70 | 63 | 66 | 73 | 77 | 75 | 83 | 87 | 72 |
| Effect of lowering heat generation through hydrazide compound (index on the basis that reciprocal of tan $\delta$ at 60° C. in each control (shown in lower row) is 100) |  |  |  |  |  | 109 | 115 |  | 110 |  |  |
| Comparative Example No. as a control |  |  |  |  |  | 3 | 3 |  |  |  |  |
| Wet-gripping property (index on the basis that tan $\delta$ at 0° C. in Comparative Example No. 1 is 100) | 127 | 222 | 278 | 330 | 210 | 230 | 225 | 203 | 200 | 205 | 195 |

*1: 50 parts by weight of carbon black HAF is replaced with 30 parts by weight of carbon black HAF, 20 parts by weight of silica and 2.0 parts by weight of silane coupling agent (bis[(triethoxy)silylpropyl]tetrasulfide, SI 69 made by Degussa)
*2: The bromine atomic content of parabromomethylstyrene unit in the copolymer is 1.2% by weight instead of 2.0% by weight.

TABLE 3

|  | Example No. (parts by weight) | | | | | | | | | | | | |
|---|---|---|---|---|---|---|---|---|---|---|---|---|---|
|  | 1 | 2 | 3 | 4 | 5 | 6 | 7 | 8 | 9 | 10 | 11 | 12 | 13*1 |
| Natural rubber | 90 | 70 | 60 | 50 | 70 | 70 | 70 | 70 | 40 | 70 | 70 | 70 | 70 |
| Copolymer | 10 | 30 | 40 | 50 | 30 | 30 | 30 | 30 | 30 | 30 | 30 | 30*2 | 30 |
| JSR SBR #1500 |  |  |  |  |  |  |  |  | 30 |  |  |  |  |
| Isophthalic acid dihydrazide | 0.3 | 0.3 | 0.3 | 0.3 | 0.1 | 0.5 | 1.0 | 1.5 | 0.3 |  |  | 0.3 | 0.3 |
| Isonicotinic acid dihydrazide |  |  |  |  |  |  |  |  |  | 1.0 |  |  |  |
| 2-hydroxy-3-naphthoic acid hydrazide |  |  |  |  |  |  |  |  |  |  | 1.0 |  |  |
| Low hysteresis loss (index on the basis that reciprocal of tan $\delta$ at 60° C. in Comparative Example No. 1 is 100) | 117 | 107 | 90 | 84 | 89 | 114 | 123 | 127 | 80 | 106 | 113 | 98 | 104 |
| Effect of lowering heat generation | 13 | 133 | 128 | 133 | 112 | 142 | 153 | 158 | 121 | 133 | 141 | 123 | 120 |

TABLE 3-continued

| | Example No. | | | | | | | | | | | | (parts by weight) |
|---|---|---|---|---|---|---|---|---|---|---|---|---|---|
| | 1 | 2 | 3 | 4 | 5 | 6 | 7 | 8 | 9 | 10 | 11 | 12 | 13*[1] |
| through hydrazide compound (index on the basis that reciprocal of tan δ at 60° C. in each control (shown in lower row) is 100) Comparative Example No. as a control | 13 | 14 | 15 | 16 | 14 | 14 | 14 | 14 | 17 | 14 | 14 | 23 | 22 |
| Wet-gripping property (index on the basis that tan δ at 0° C. in Comparative Example No. 1 is 100) | 123 | 197 | 240 | 300 | 199 | 194 | 190 | 188 | 215 | 201 | 195 | 195 | 202 |

*[1]: 50 parts by weight of carbon black HAF is replaced with 30 parts by weight of carbon black HAF, 20 parts by weight of silica and 2.0 parts by weight of silane coupling agent (bis[(triethoxy)silylpropyl]tetrasulfide, SI 69 made by Degussa)
*[2]: The bromine atomic content of parabromomethylstyrene unit in the copolymer is 1.2% by weight instead of 2.0% by weight.

As seen from Comparative Examples 1–5 varying the amount of butyl rubber (IIR) compounded, as the amount of IIR increases, the values of tan δ at 0° C. and 60° C. become large and hence not only the wet-gripping property but also the hysteresis loss increase.

As seen from Comparative Examples 6–10 containing variable amount of IIR and a given amount of the hydrazide compound (isophthalic acid dihydrazide), the value of tan δ at 60° C. is lowered to develop the effect of lowering heat generation as compared with Comparative Examples 1–5 containing no hydrazide compound, but such an effect is decreased with the increase of the IIR amount. Furthermore, the lowering of tan δ at 0° C. is less and the wet-gripping property is hardly affected.

When Comparative Example 11 using IIR is compared with Comparative Example 12 using Br—IIR in which the reactivity is higher than that of IIR, the effect of lowering heat generation at 60° C. is observed but is insufficient in Comparative Example 12.

As seen from Comparative Examples 13–16, the copolymer raises tan δ at 0° C. likewise IIR and increases the value of tan δ at 60° C.

In Comparative Example 17 using natural rubber/copolymer/SBR as a rubber ingredient, the effect of lowering heat generation and the gripping property are poor.

Comparative Examples 18 and 19 are cases of changing the kind of the hydrazide compound used. However, these examples contain IIR likewise Comparative Examples 6–10, so that the improvement of the wet-gripping property is observed, but the effect of lowering heat generation is low because the copolymer is not included.

As seen from Comparative Examples 20–22, even when the compounding of carbon black or the like is changed, the effect of lowering heat generation is not observed.

In Comparative Example 23 decreasing the amount of Br in the copolymer, the effect of lowering heat generation is not observed.

In Examples 1–4, the amount of the copolymer is varied with a constant amount of isophthalic acid dihydrazide. When they are compared with Comparative Examples 13–16, it is understood that the effect of lowering heat generation is considerably improved. On the other hand, the wet-gripping property is hardly affected, so that these examples can establish both the effect of lowering heat generation and the wet-gripping property.

In Examples 5–8, the influence of the amount of hydrazide compound upon the effect is examined, from which it is clear that when the amount of the hydrazide compound is increased within a range of 0.1–1.5 parts by weight, the value of tan δ at 60° C. is lowered.

The desired effect is obtained even in Example 9 using natural rubber/copolymer/SBR as a rubber ingredient.

Examples 10–11 are cases of changing the kind of the hydrazide compound used and develop the desired effect likewise the case using isophthalic acid dihydrazide.

As seen from Example 12, when the bromine atomic content in the copolymer is reduced, the effect of lowering heat generation is somewhat reduced, but the sufficiently low value of tan δ (60° C.) is obtained as compared with Comparative Example 8 containing 30 parts by weight of IIR or the like.

Example 13 containing 20 parts by weight of silica (carbon black: 30 parts by weight) shows that the wet-gripping property and the low hysteresis loss are established.

As mentioned above, according to the invention, the specified hydrazide compound exhibiting the effect of lowering heat generation is compounded with the copolymer having given isobutylene unit, paramethylstyrene unit and parabromomethylstyrene unit and the diene polymer rubber, whereby there can be provided rubber compositions capable of lowering tan δ at 60° C. without substantially changing the value of tan δ at 0° C.

Furthermore, when the rubber composition according to the invention is used as a tread rubber for a pneumatic tire, the high wet-gripping property and the low rolling resistance can be established.

What is claimed is:

1. A rubber composition comprising (1) 10–50 parts by weight of a copolymer containing isobutylene unit, a paramethylstyrene unit and a parabromomethylstyrene unit; (2) (100–Q) parts by weight of natural rubber and/or diene synthetic rubber when the amount of the copolymer of the above item (1) is Q; (3) 20–150 parts by weight of carbon black; and (4) 0.1–5.0 parts by weight of at least one hydrazide compound represented by the following general formulae (I), (II) and (III):

$$H_2NHNC-A-CNHNH_2 \quad (I)$$

$$X-B-CNHNH_2 \quad (II)$$

$$Y-CNHNH_2 \quad (III)$$

wherein A is a bivalent group obtained from an aromatic ring, a substituted or nonsubstituted hydantoin ring, or a saturated or unsaturated straight-chain hydrocarbon having a carbon number of 1–18, B is a bivalent aromatic hydrocarbon group, X is a hydroxyl group or an amino group, and Y is a pyridyl group or a hydrazino group.

2. A rubber composition according to claim 1, wherein a total content of paramethylstyrene unit and parabromomethylstyrene unit in the copolymer is 0.5–20% by weight, and a content of parabromomethylstyrene unit as an atomic content of bromine is 0.1–7.5% by weight.

3. A rubber composition according to claim 1, wherein the hydrazide compound is at least one compound selected from the group consisting of phthalic acid dihydrazide, terephthalic acid dihyrdazide, isophthalic acid dihydrazide, succinic acid dihydrazide, adipic acid dihydrazide, azelaic acid dihydrazide, sebacic acid dihydrazide, eicosane diacid dihydrazide, 7,11-octadecadiene-1,18-dicarbohydrazide, oxalic acid dihydrazide, anthraniloylhydrazide, salicylic acid hydrazide, 4-hydroxybenzoic acid hydrazide, 2-hydroxy-3-naphthoic acid hydrazide, isonicotinic acid hydrazide and carbodihydrazide.

4. A rubber composition according to claim 3, wherein the hydrazide compound is 2-hydroxy-3-naphthoic acid hydrazide, isophthalic acid dihyrazide or isonicotinic acid hydrazide.

5. A rubber composition according to claim 4, wherein the hydrazide compound is 2-hydroxy-3-naphthoic acid hydrazide.

6. A rubber composition according to claim 1, wherein the diene synthetic rubber is at least one rubber selected from the group consisting of cis-1,4-polyisoprene, styrene-butadiene copolymer, low cis-1,4-polybutadiene, high cis-1,4-polybutadiene, ethylene-propylene-diene terpolymer, chloroprene, halogenated butyl rubber and acrylonitrile-butadiene rubber.

* * * * *